Sept. 29, 1942. J. E. CUSHMAN 2,297,648
MANDREL
Filed Feb. 16, 1942
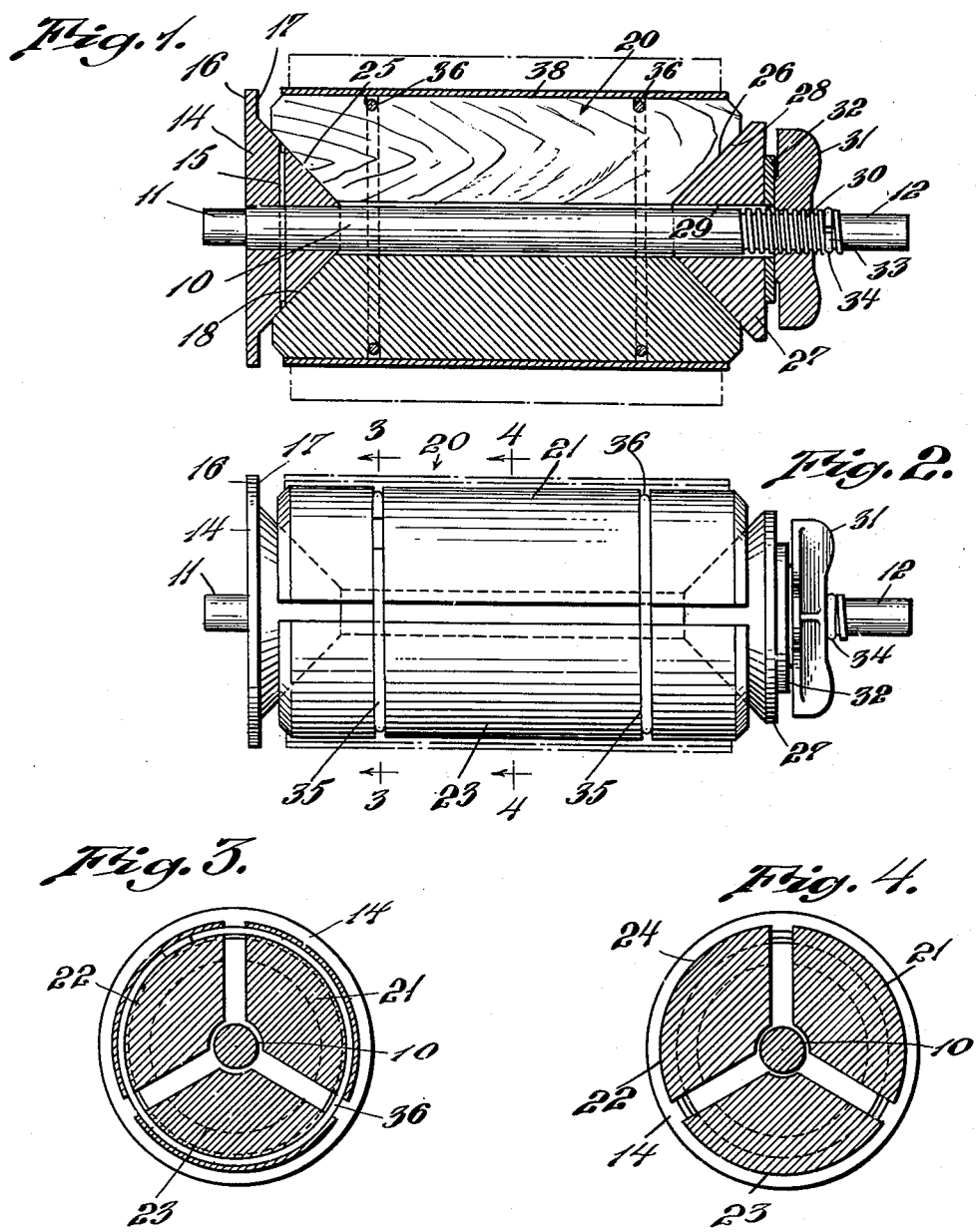
INVENTOR
Joseph E. Cushman
BY Barlow & Barlow
ATTORNEYS Patented Sept. 29, 1942

2,297,648

UNITED STATES PATENT OFFICE 2,297,648

MANDREL

Joseph E. Cushman, Stonington, Conn., assignor to Atwood Machine Company, a corporation of Connecticut Application February 16, 1942, Serial No. 431,115

2 Claims. (Cl. 242—124)

This invention relates to a mandrel, and has for one of its objects to afford a simple and positive means of releasably holding a hollow or cylindrical tube in position.

Another object of the invention is to provide a mandrel with simple and positive means which will firmly hold a hollow tube or cylinder but which may easily and quickly release the same from the mandrel.

Another object of the invention is to provide expansion by means of a wedge action through manual manipulation of a wing nut or the like.

With these and other objects in view, the invention consists of certain novel features of construction, as will be more fully described and particularly pointed out in the appended claims.

In the accompanying drawing:

Fig. 1 is a central sectional view of the mandrel and tube mounted thereon.

Fig. 2 is an elevational view, illustrating in dotted lines the position to which the segments of the body may move.

Fig. 3 is a section on line 3—3 of Fig. 2.

Fig. 4 is a section on line 4—4 of Fig. 2.

In proceeding with this invention, I provide a cylinder divided into segments and by relative movement wedge outwardly the segments at each of their ends to expand the cylinder, thus increasing the diameter of the cylinder so as to cause its surface to tightly engage and grip a hollow tube which is placed over the segments of the cylinder which form the body. This movement is caused by any means which will cause the wedges to operate, but I find particularly adaptable a hand operated wing nut and screw on the center spindle for causing this operation.

With reference to the drawing, 10 designates the spindle, usually of metal, which is reduced at each end 11 and 12 to provide trunnions to fit into some bearing in which the mandrel is rotatably mounted. A head 14, usually of wood, is fixed to the spindle 10 by means of a pin 15 extending through the head and through the spindle. This prevents this head from axial movement along the spindle and also prevents rotation of the head. This head is flanged as at 16 to provide an edge to be gripped by the fingers and also an abutment surface 17, and is formed conical or inwardly tapering as at 18 at such an angle as to permit the body sections or segments to slide therealong.

The body designated generally 20 is usually of wood and consists of a plurality of segments, here shown as three, 21, 22 and 23 as shown in Fig. 3, although any suitable number may be provided, which, when together and in contracted position form substantially a cylindrical surface 24 about the spindle as an axial center. The ends of these segments are tapered as at 25 to substantially fit the conical surface 18 of the head member 14, so that if these segments are moved axially towards the left as shown in Figs. 1 and 2 these segments will be wedged outwardly to increase the diameter of the cylindrical body.

These body segments are similarly tapered as at 26 at their opposite ends and a washer 27, usually of wood, tapered as at 28 to fit this inclination or taper 26 is provided with an axial opening 29 to slidably receive the spindle so that when this washer is moved axially along the spindle it will cause the body segments to be wedged outwardly to increase their diameter.

The spindle is threaded as at 30 and a nut of suitable shape and material 31 engages the threads of this spindle and serves to press against the wooden washer 27 through a metal ring washer 32. A groove 33 may be provided in the spindle with a spring lock ring 34 in this groove to limit the outward movement of the nut 31 when turned counter-clockwise. Grooves 35 extend circumferentially about the body, and spring rings or wires 36 are located in each of these grooves and tend to exert a contracting circular pressure upon the segments to move them inwardly towards the spindle, while being sufficiently resilient to permit expansion of the segments when the nut 31 is operated.

In use, the hollow tubular cylinder 38 would be positioned on the body 20 when in contracted position such as shown in Fig. 1 and if not centralized would be limited by the abutment 17. Then to secure this cylinder in position the nut 31 would be rotated to cause pressure to be exerted on the washer 27 and through movement of this washer cause movement axially of the segments 21, 22 and 23 to expand their opposite ends. Thus these segments would be expanded to the dotted line position shown in Fig. 2 and the tube would be gripped. The tube would be limited by the abutment 17.

I claim:

1. A mandrel comprising a spindle having the end portions thereof reduced providing trunnions for mounting the same in position, an inwardly tapered abutment head fixed on said spindle against longitudinal movement thereon, an inwardly tapered washer on said spindle freely movable longitudinally along the spindle, a plurality of body segments having inwardly tapered ends to fit said head and washer and provided with external circumferential grooves, resilient split lock rings in said grooves tending to contract and hold the segments about the spindle and in engagement with said head and washer and tending to move said washer in a direction to permit contraction of said segments, a flat washer engaging said tapered washer, threads on the spindle inwardly of said trunnions, a wing nut engaging the threads and engaging the flat washer to expand the segments against the resiliency of said lock rings when said nut is advanced on said spindle.

2. A mandrel comprising a spindle having the end portions thereof reduced providing trunnions for mounting the same in position, threads on said spindle adjacent one of said trunnions, an inwardly tapered abutment head fixed to said spindle against longitudinal movement thereon and at a position thereon adjacent the trunnion distal from the said threaded portion, an inwardly tapered washer on said spindle having a bore of a size to be freely movable longitudinally along the spindle and over said threaded portions, a plurality of body segments having inwardly tapered ends to fit said head and washer, and provided with external circumferential grooves, resilient means in said grooves tending to contract and hold the segments about the spindle and in engagement with said head and washer, a flat washer engaging said tapered washer, a nut engaging said threads and flat washer to move said tapered washer towards the head to expand the segments against the resiliency of said means, said tapered washer being movable in the opposite direction by the contraction of said segments when said nut is moved outwardly along said threads.

JOSEPH E. CUSHMAN.